(12) United States Patent
Miskowicz

(10) Patent No.: US 9,137,040 B2
(45) Date of Patent: Sep. 15, 2015

(54) METHOD OF CONTROLLING ACCESS OF DEVICES TO COMMUNICATION MEDIUM IN DISTRIBUTED NETWORKS

(75) Inventor: Marek Miskowicz, Cracow (PL)

(73) Assignee: AKADEMIA GORNICZ0-HUTNICZA IM STANISLAWA STASZICA, Cracow (PL)

( * ) Notice: Subject to any disclaimer, the term of this patent is extended or adjusted under 35 U.S.C. 154(b) by 886 days.

(21) Appl. No.: 13/256,285

(22) PCT Filed: Mar. 13, 2010

(86) PCT No.: PCT/PL2010/050011
§ 371 (c)(1),
(2), (4) Date: Nov. 28, 2011

(87) PCT Pub. No.: WO2010/104408
PCT Pub. Date: Sep. 16, 2010

(65) Prior Publication Data
US 2012/0093163 A1  Apr. 19, 2012

(30) Foreign Application Priority Data

Mar. 13, 2009 (PL) .......................... 387490

(51) Int. Cl.
*H04L 12/28* (2006.01)
*H04L 12/413* (2006.01)

(52) U.S. Cl.
CPC .................................. *H04L 12/413* (2013.01)

(58) Field of Classification Search
CPC ............................... H04W 28/18; H04L 12/56
USPC ........................................................ 370/400
See application file for complete search history.

(56) References Cited

U.S. PATENT DOCUMENTS 5,297,143 A    3/1994  Fridrich et al.
2002/0154653 A1  10/2002  Benveniste (Continued)

OTHER PUBLICATIONS

International Search Report mailed Aug. 11, 2010, corresponding to International Patent Application No. PCT/PL2010/050011.

(Continued)

*Primary Examiner* — Shripal Khajuria
*Assistant Examiner* — Faisal Choudhury
(74) *Attorney, Agent, or Firm* — Ladas & Parry LLP

(57) ABSTRACT

Method of controlling the access of devices to the communication media in distributed networks of CSMA (Carrier Sense Multiple Access) type is characterized by that each time before the packet transmission attempt, if the communication medium is detected to be idle, the prespecified fixed time interval equal to the minimum interpacket space is timed out during which the random numbers of time slots defining the order of media access are selected from the fixed number of slots of equal width using the pseudorandom number generator in every node where the probability of a selection of a particular slot is geometric with a characteristic parameter defined as the ratio of the probability of a selection of a given slot to the probability of a selection of the next slot, which changes from zero to one as a discrete function of the state of the node's counter, and after that the time interval of random delay corresponding to the selected random is assigned. After the minimum interpacket space the phase of known sequential priority access is started and subsequently, the random delay assigned previously is timed out and at the same time the state of the communication medium is sensed again, and if the communication medium is still sensed idle, it is made available to the node with the lowest number of the slot randomly selected. After completing a given packet reception, the states of the counters in all the nodes in a given network segment are increased by the increment defining the number of expected packets that will be generated in a result of the reception of the transmitted packet reduced by one, and next, the cycle is repeated. During the data packet transmission the collisions are detected optionally in the communication medium by the collision detectors, and next, the states of the counters are changed in the nodes with the use of the corresponding control signals obtained from the collision detectors, and in case the communication medium is detected to be idle after the time equal to the sum of the minimum interpacket space and the time delay defined by the prespecified fixed maximum number of slots, the states of the counters in all the nodes in a given network segment are decreased by one with the use of the control signals obtained from the communication medium state detectors.

3 Claims, 1 Drawing Sheet

(56) References Cited

U.S. PATENT DOCUMENTS

| | | |
|---|---|---|
| 2003/0137989 A1 | 7/2003 | Nagai |
| 2007/0206551 A1* | 9/2007 | Moorti et al. ............... 370/338 |
| 2008/0076466 A1* | 3/2008 | Larsson .................... 455/522 |
| 2008/0279126 A1* | 11/2008 | Katar et al. ................ 370/294 |
| 2012/0106497 A1* | 5/2012 | Denteneer et al. ............ 370/329 |

OTHER PUBLICATIONS

K. Jamieson, H. Balakrishan, Y.C. Tay: "Sift: A MAC Protocol for Event-Driven Wireless Sensor Network" Internet article, May 1, 2003, pp. 1-23, URL: www.citeseerx.ist.psu.edu/viewdoc/.

* cited by examiner

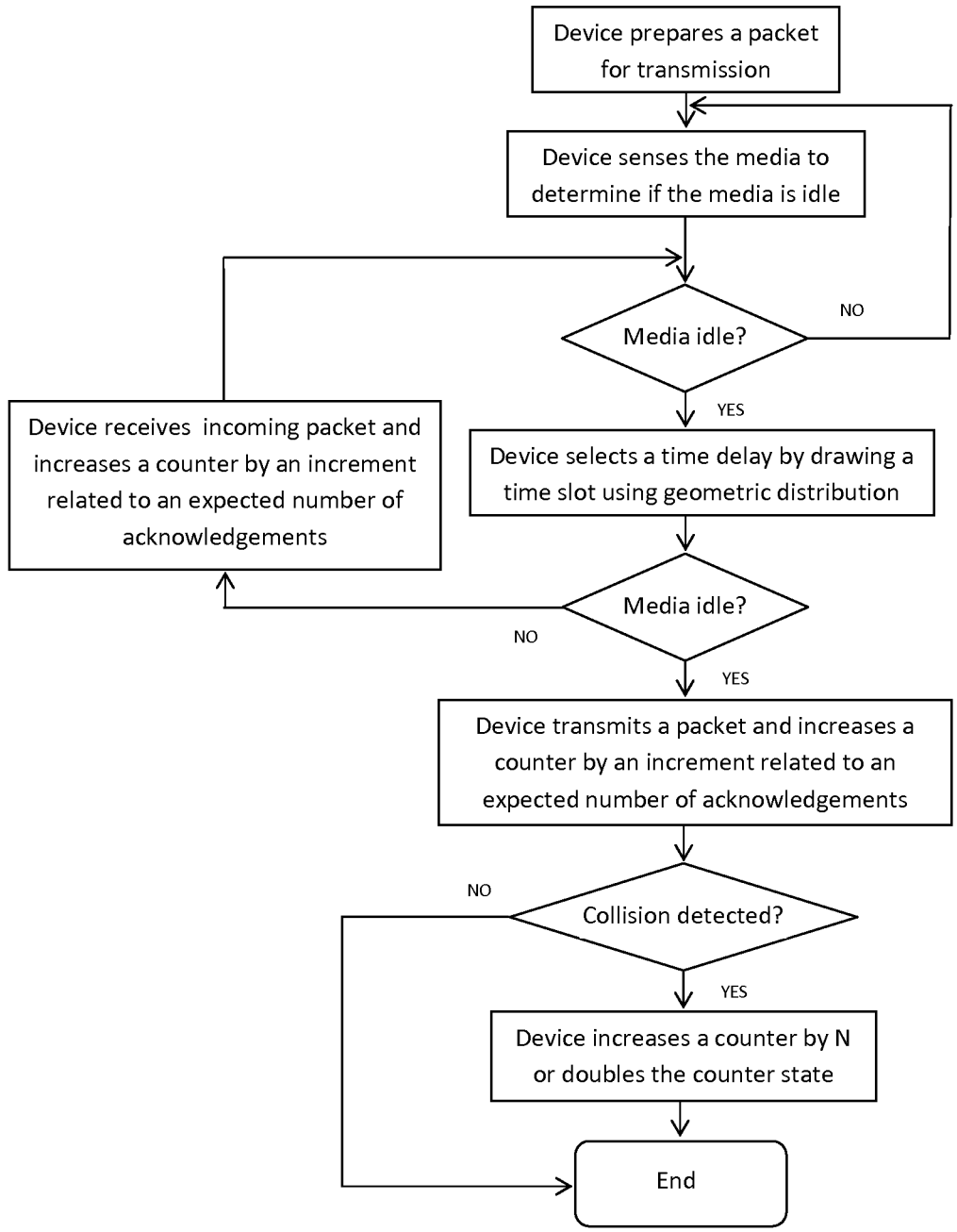

METHOD OF CONTROLLING ACCESS OF DEVICES TO COMMUNICATION MEDIUM IN DISTRIBUTED NETWORKS

This application is a 371 of PCT/PL2010/050011, filed on Mar. 13, 2010, which is incorporated herein by reference.

FIELD OF THE INVENTION

The subject of the invention is a method of controlling the access of devices to the communication medium in distributed networks applied especially in monitoring and control systems in various industrial processes, among others in chemical industry, and also in control systems installed in buildings.

BACKGROUND OF THE INVENTION

A solution known from U.S. Pat. No. 5,297,143 as well as from "LonTalk Protocol Specification", Version 3.0, Echelon Corporation, 1995, presents a method of controlling the access of devices to the communication media in distributed networks of CSMA (Carrier Sense Multiple Access) type during communication of a group of devices, each of which is a node of a distributed network and generates data sent in packet cycles with the use of the communication medium in a system with or without acknowledgment of a message reception while before the attempt of a packet transmission a state of the communication medium is sensed each time using the state detectors of particular nodes connected to this medium.

When the communication medium is sensed idle, in each packet cycle the prespecified fixed time interval called the minimum interpacket space is timed out by the use of a clock in every node, while during the minimum interpacket space a number of available time slots of equal width is changed depending on the current state of the counter residing in a node where this number is defined as the product of a number of slots in a basic contention window and the current state of the counter. Afterwards, the random numbers of time slots that define the order of media access are selected from the currently available number of slots using the pseudorandom number generator where the probability distribution of sampling the time slots is uniform, and the random time interval defined as the product of the random number of the previously selected time slot reduced by one and the prespecified width of a single time slot is assigned.

Subsequently, after the minimum interpacket space the phase of sequential priority access starts consisting in timing out concurrently the time delay assigned in the priority phase by the use of a clock residing in each node where this delay equals the product of the number of a priority slot assigned to a particular node reduced by one and the prespecified width of a single priority slot, and the state of the communication medium is sensed again, and if the communication medium is still detected to be idle, it is made available to the node with the lowest number of the assigned priority slot. When a given node starts a transmission, by the use of signals generated by the detectors of the communication medium state, the timing out of time delays of priority slots is terminated in the other nodes with higher numbers of the assigned priority slots, and simultaneously the receiving inputs in all the nodes in the network segment are activated.

After completing the priority packet reception, the state of the communication medium is sensed again by all the nodes in the network segment, and if the medium is detected to be idle, the time interval equal to the minimum interpacket space is timed out, and the cycle is repeated for the successive number of a priority slot. Next, if during the prespecified maximum number of the priority time slots, the medium is sensed to be idle by the detectors of a communication medium state, or if the prespecified number of the priority slots equals zero, the random delay assigned previously is timed out, and at the same time the state of the communication medium is sensed again. If the communication medium is still detected to be idle, it is made available to the node with the lowest number of the slot randomly selected.

When the transmission starts, the timing out of the time delays is terminated by the use of the detectors of the communication medium state in the other nodes with higher numbers of slots randomly selected and the receiving inputs in all the nodes are activated at the same time. After completing a given packet transmission, the states of the counters in all the nodes in a given network segment are changed by the increment defining the number of expected packets generated as a result of the reception of a transmitted packet reduced by one, and the state of the communication medium is sensed again by all the nodes. If the medium is detected to be idle, the minimum interpacket space is timed out and simultaneously the number of available time slots is changed in each node depending on the current state of its counter, and the random numbers from the sets of currently available slots are selected, and afterwards, the random delay is assigned, and finally, the assigned random delay is timed out after the minimum interpacket space, and the cycle is repeated.

During the data packet transmission the collisions are detected optionally by the collision detectors, and afterwards, the states of the counters residing in the nodes are increased by one with the use of the corresponding control signals obtained from the collision detectors. If the communication medium is still idle after the time equal to the sum of the minimum interpacket space and the time delay defined by the prespecified number of time slots included in the basic contention window, the state of the counters in all the nodes in a given network segment is decreased by one with the use of the corresponding control signals obtained from the communication medium state detectors.

In the other solution known from the technical literature (K. Jamieson, H. Balakrishnan, Y. Tay, "Sift: A MAC protocol for event-driven wireless sensor networks", Technical Report, Massachusetts Institute of Technology, LCS-TR-894, 2003) introducing a method of controlling the access to the communication medium of CSMA-type each time before the attempt of packet transmission the state of the communication medium is sensed using the state detectors in each node connected to this medium, and if the medium is detected to be idle, in each packet cycle the prespecified fixed time interval called the minimum interpacket space is timed out by the use of a clock residing in every node, and at the same time the numbers of slots determining the order of the medium access are randomly selected in each node from the prespecified fixed number of time slots of equal width by the use of the pseudorandom generators, while the probability of a random selection of a given slot is geometrically distributed with a characteristic parameter defined as the ratio of the probability of a selection of a given slot to the probability of a selection of the next slot, the value of which is greater than zero and at the same time smaller than or equal to one, and afterwards, the random delay is assigned as the time interval equal to the product of the time slot number selected previously reduced by one and the prespecified width of a single time slot.

Next, after the minimum interpacket space the random delay assigned previously is timed out and the state of the communication medium is at the same time sensed again, whereas, if the medium is detected to be idle, it is made available to the node that has selected the time slot with the lowest number among the numbers randomly selected by all the nodes. When a given node starts to transmit, the timing out of random delays in the other nodes with higher numbers of selected time slots is terminated by the use of the communication medium state detectors, and simultaneously the receiving inputs of the nodes are activated. After completing the reception of the transmitted packet by all the nodes, the state of the communication medium is sensed again, and if the medium is detected to be idle, the minimum interpacket space is timed out and the numbers of the time slots from the prespecified fixed number of available time slots are randomly selected concurrently, and then, the random delay is assigned, and after the minimum interpacket space the random time delay assigned previously is timed out, and the cycle is repeated.

BRIEF DESCRIPTION OF THE DRAWING

FIG. 1 shows a schematic diagram of the method of the invention.

DETAILED DESCRIPTION OF THE INVENTION

Referring now to FIG. 1, the method according to the invention consists of communicating with each other a group of devices connected to a shared communication link, each of which is a node of a distributed network and generates data transmitted in packet cycles to at least one node using acknowledged or unacknowledged message service in a way that at the moment of generation of data by any node in the network, the state of the communication medium is sensed by the use of the medium state detector, and if the medium is detected to be idle, the prespecified fixed minimum interpacket space is timed out in each packet cycle by the use of a clock in each node, and during the minimum interpacket space the numbers of slots determining the order of the medium access are randomly selected from the prespecified fixed number of available time slots of equal width by the use of the pseudorandom generators at each node, and the random delay to every node is assigned equal to the product of the randomly selected time slot reduced by one and the prespecified width of a single slot.

After the time equal to the minimum interpacket space, the phase of sequential priority access is started consisting in that in each node using a clock the priority time delay concurrently is timed out as the product of the number of the assigned priority slot reduced by one and the prespecified width of the priority time slot, and the state of the communication medium is sensed again, and if the medium is detected to be idle, it is made available to the node with the lowest number of the assigned priority slot, and when a given node starts a transmission, the timing out of time delay of the priority slots is terminated by the use of signals from detectors of the communication medium state in the other nodes of higher numbers of the assigned priority slots, and simultaneously the receiving inputs are activated in all the nodes in the network segment.

After completing a given priority packet reception, the state of the communication medium is sensed again by all the nodes, and if the medium is detected to be idle, the minimum interpacket space is timed out and then the cycle is repeated for the successive number of the priority time slot, and subsequently, after the timing out of the duration of the prespecified maximum number of priority slots and sensing the medium to be idle by the detectors of the communication medium state in all the nodes, or if the prespecified number of the priority slots equals zero, the random delay assigned previously is timed out and at the same time the state of the communication medium is sensed again, and if the communication medium is detected to be idle after the assigned random delay, the medium is made available to the node with the lowest number of the slot randomly selected, and the states of the counters in all the nodes are changed as soon as every node receives the transmitted packet depending on the packet class or if the collision is detected in the communication medium.

The essence of the solution according to the invention is consists in that each time before the packet transmission attempt, the state of the communication medium is sensed using the state detectors of particular nodes connected to this medium, and if the communication medium is detected to be idle, the prespecified fixed time interval equal to the minimum interpacket space is timed out by the use of a clock in every node in each packet cycle, while during the minimum interpacket space, the random numbers of time slots defining the order of media access are selected from the fixed number of slots of equal width using the pseudorandom number generator in every node, and the probability of a selection of a particular slot is geometric with a characteristic parameter defined as the ratio of the probability of a selection of a given slot to the probability of a selection of the next slot, which changes from zero to one as a discrete function of the state of the node's counter in a way that a change of the counter state from one to the prespecified maximum number corresponds to a change of the characteristic parameter from the maximum to the minimum value and after that the time interval of random delay is assigned which is equal to the product of the number of a slot randomly selected reduced by one and the prespecified width of a single slot.

Next, after the minimum interpacket space the phase of sequential priority access is started consisting in that the time interval assigned to a node is timed out concurrently by the use of a clock residing in each node, and this time interval is equal to the product of the number of a priority slot assigned to the particular node reduced by one and the prespecified width of a single priority slot. Next, the state of the medium is sensed again, and if the medium is detected to be idle, it is made available to the node with the lowest number of the assigned priority slot, and when a transmission starts the timing out of time delay in the other nodes with higher numbers of the assigned priority slots is terminated, and simultaneously the receiving inputs in all the nodes in the network segment are activated.

After completing a given priority packet reception, the state of the communication medium is sensed again by all the nodes, and if the medium is detected to be idle, the minimum interpacket space is timed out, and the cycle is repeated for the successive number of the priority slot. Subsequently, if the medium is sensed to be idle by the detectors of the communication medium state in all the nodes after the timing out of the duration of the prespecified maximum number of the priority slots or if the prespecified number of the priority slots equals zero, the random delay previously assigned is timed out and at the same time the state of the communication medium is sensed again. If the communication medium is still sensed idle, it is made available to the node with the lowest number of the slot randomly selected. When a given node starts a transmission, the timing out of the time delays is terminated by the use of the detectors of the communication medium state in the other nodes with higher numbers of slots randomly selected, and their receiving inputs in all the nodes are activated at the same time.

After completing a given packet reception, the states of the counters in all the nodes in a given network segment are increased by the increment defining the number of expected packets that will be generated in a result of the reception of the transmitted packet reduced by one. Afterwards, the state of the communication medium is sensed again by all the nodes and if the communication medium is detected to be idle, the minimum interpacket space is timed out. Concurrently with the timing out of the minimum interpacket space, the random numbers are selected from the prespecified fixed number of available slots and the random delay is assigned to each node, and subsequently after the minimum interpacket space the random delay assigned previously is timed out, and at the same time the state of the communication medium is sensed again, and the cycle is repeated.

Besides, during the data packet transmission the collisions are detected optionally in the communication medium by the collision detectors, and after the collision detection the states of the counters are changed in the nodes with the use of the corresponding control signals obtained from the collision detectors. In case the communication medium is detected to be idle after the time equal to the sum of the minimum interpacket space and the time delay defined by the prespecified fixed maximum number of slots, the states of the counters in all the nodes in a given network segment are decreased by one with the use of the corresponding control signals obtained from the communication medium state detectors. After the detection of a collision in the communication medium, the state of the counters in the nodes are increased by a constant increment N, where N is a natural number, or the current states of the counters are doubled.

The method, according to the invention, enables an increase of the network throughput and its optimization for various levels of load of the communication medium by the use of slot random selection from the geometric probability distribution with the characteristic parameter changing as a discrete function of a state of a node's counter, and also enables the reduction of message transmission time because of a constant number of available time slots which is independent of the state of the counter. Furthermore, the method, according to the invention, excludes the possibility of incorrect identification of a packet cycle as idle, that is, without any transmission in a situation when the nodes competing for the communication medium access have selected the numbers of slots beyond the set of slot numbers defining the size of the basic contention window which causes the decrease of the state of the node's counter by one after the time equal to the duration of the basic contention window.

The solution according to the invention is presented as follows.

The method according to the invention, consists in that each time before the packet transmission attempt in a system of packet cycles, the state of the communication medium is sensed using the state detectors of particular nodes connected to this medium, and if the communication medium is detected to be idle, the prespecified fixed time interval equal to the minimum interpacket space is timed out by the use of a clock in every node in each packet cycle. During the minimum interpacket space, the random numbers of time slots defining the order of media access are selected from the prespecified fixed number of slots equal to sixteen using the pseudorandom number generator in every node where the probability of a selection of a particular slot is geometric with a characteristic parameter defined as the ratio of the probability of a selection of a given slot to the probability of a selection of the next slot, which changes from zero to one as a discrete function of the state of the node's counter in a way that a change of the counter state from one to the prespecified maximum number corresponds to a change of the characteristic parameter from the maximum to the minimum value, and after that the time interval of random delay is assigned which is equal to the product of the number of a slot randomly selected reduced by one and the prespecified width of a single slot.

Next, after the minimum interpacket space the phase of sequential priority access is started consisting in that the time interval assigned to a node is timed out concurrently by the use of a clock residing in each node, and this time interval is equal to the product of the number of a priority slot assigned to the particular node reduced by one and the prespecified width of a single priority slot, and next, the state of the medium is sensed again, and if the medium is detected to be idle, it is made available to the node with the lowest number of the assigned priority slot. When a given node starts a transmission, the timing out of time delay in the other nodes with higher numbers of the assigned priority slots is terminated, and simultaneously the receiving inputs in all the nodes in the network segment are activated.

After completing a given priority packet reception, the state of the communication medium is sensed again by all the nodes, and if the medium is detected to be idle, the minimum interpacket space is timed out, and the cycle is repeated for the successive number of the priority slot. Subsequently, if the medium is sensed to be idle by the detectors of the communication medium state in all the nodes after the timing out of the duration of the prespecified maximum number of the priority slots or if the prespecified number of the priority slots equals zero, the random delay assigned previously is timed out, and at the same time the state of the communication medium is sensed again, and if the communication medium is still sensed idle, it is made available to the node with the lowest number of the slot randomly selected.

When a given node starts a transmission, the timing out of the time delays is terminated by the use of the detectors of the communication medium state in the other nodes with higher numbers of slots randomly selected, and their receiving inputs in all the nodes are activated at the same time.

After completing a given packet reception, the states of the counters in all the nodes in a given network segment are increased by the increment defining the number of expected packets that will be generated in a result of the reception of the transmitted packet reduced by one, and afterwards, the state of the communication medium is sensed again by all the nodes and if the communication medium is detected to be idle, the minimum interpacket space is timed out, and at the same time the random numbers are selected from the prespecified fixed number of available slots and the random delay is assigned to each node, and subsequently after the minimum interpacket space the random delay assigned previously is timed out, and at the same time the state of the communication medium is sensed again, and the cycle is repeated.

Besides, during the data packet transmission the collisions are detected optionally in the communication medium by the collision detectors, and next, by the use of the corresponding control signals obtained from the collision detectors, the states of the counters in the nodes are increased by a constant increment N, or the current states of the counters are doubled where N is a natural number. In case the communication medium is detected to be idle after the time equal to the sum of the minimum interpacket space and the time delay defined by the prespecified fixed maximum number of slots, the states of the counters in all the nodes in a given network segment are decreased by one with the use of the control signals obtained from the communication medium state detectors.

The invention claimed is:

1. A method of controlling access of devices to a communication medium in distributed networks, the method comprising:

communicating, with each other, a group of devices connected to a shared communication link, each of which is a node of a distributed network;

generating data transmitted in packet cycles to at least one node using acknowledged or unacknowledged message service;

sensing a state of the communication medium using state detectors of particular nodes connected to the medium each time before the packet transmission attempt;

timing out a prespecified fixed time interval equal to a minimum interpacket space by use of a clock in every node in each packet cycle if the medium is detected to be idle;

selecting random numbers of time slots from a fixed number of slots of equal width using a pseudorandom number generator in every node during the minimum interpacket space while selected random numbers of time slots define an order of media access;

setting a probability of a selection of a particular slot as geometric with a characteristic parameter defined as a ratio of the probability of a selection of a given slot to the probability of a selection of the next slot, which changes from zero to one as a discrete function of a state of a node's counter in a way that a change of the counter state from one to a prespecified maximum number corresponds to a change of a characteristic parameter from a maximum to a minimum value;

assigning a time interval of random delay which is equal to a product of the number of a slot randomly selected reduced by one and a prespecified width of a single slot;

starting a phase of sequential priority access after a minimum interpacket space while a phase of sequential priority access consists in that the time interval assigned to a node is timed out concurrently by the use of a clock residing in each node, and this time interval is equal to the product of the number of a priority slot assigned to the particular node reduced by one and the prespecified width of a single priority slot;

sensing again the state of the medium;

making available the medium to the node with a lowest number of the assigned priority slot if the medium is detected to be idle;

terminating a timing out of time delay in the other nodes with higher numbers of assigned priority slots when a given node starts a transmission;

activating simultaneously receiving inputs in all the nodes in a network segment;

sensing again the state of the communication medium by all the nodes after completing a given priority packet reception;

timing out the minimum interpacket space if the medium is detected to be idle;

repeating a cycle for a successive number of the priority slot;

subsequently, if the medium is sensed to be idle, timing out the random delay assigned previously by the detectors of the communication medium state in all the nodes after timing out the duration of the prespecified maximum number of the priority slots, and at the same time, sensing the state of the communication medium again;

making available the communication medium to the node with a lowest number of the slot randomly selected if the communication medium is still sensed idle;

when a given node starts a transmission, terminating the timing out of the time delays by the use of the detectors of the communication medium state in the other nodes with higher numbers of slots randomly selected;

activating at the same time the receiving inputs in all the nodes;

after completing a given packet reception, increasing the states of the counters in all the nodes in a given network segment by an increment defining the number of expected packets that will be generated in a result of the reception of the transmitted packet reduced by one;

afterwards sensing again the state of the communication medium by all the nodes;

timing out the minimum interpacket space if the communication medium is detected to be idle, and at the same time, selecting the random numbers from the prespecified fixed number of available slots;

assigning the random delay to each node, and subsequently timing out the random delay assigned previously after the minimum interpacket space, and at the same time sensing the state of the communication medium again;

repeating the cycle;

detecting optionally collisions in the communication medium by collision detectors during the data packet transmission;

changing the states of the counters in the nodes with the use of corresponding control signals obtained from the collision detectors after the detection of a collision; and after the time equal to a sum of the minimum interpacket space and the time delay defined by the prespecified fixed maximum number of slots, decreasing the states of the counters in all the nodes in a given network segment by one with the use of the corresponding control signals obtained from the communication medium state detectors in case the communication medium is detected to be idle.

2. The method according to claim 1, wherein the states of the counters in the nodes are increased after detection of a collision in the communication medium by a constant increment N where N is a natural number.

3. The method according to claim 1, wherein the state of the counters in the nodes are doubled after detection of a collision in the communication medium.

* * * * *